(12) United States Patent
Seki

(10) Patent No.: US 7,701,090 B2
(45) Date of Patent: Apr. 20, 2010

(54) ACTIVE FILTER

(75) Inventor: Kempei Seki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 282 days.

(21) Appl. No.: 11/769,796

(22) Filed: Jun. 28, 2007

(65) Prior Publication Data

US 2008/0174183 A1 Jul. 24, 2008

(30) Foreign Application Priority Data

Jan. 18, 2007 (JP) .............................. 2007-009475

(51) Int. Cl.
*H02J 3/01* (2006.01)
*G01R 23/20* (2006.01)
(52) U.S. Cl. ...................................... 307/105; 324/623
(58) Field of Classification Search ................. 307/105; 324/623
See application file for complete search history.

(56) References Cited

U.S. PATENT DOCUMENTS

| | | | | |
|---|---|---|---|---|
| 5,334,877 | A * | 8/1994 | Mohan et al. .................. | 307/46 |
| 5,977,660 | A * | 11/1999 | Mandalakas et al. ......... | 307/105 |
| 6,320,392 | B1 * | 11/2001 | Jonsson ........................ | 324/623 |
| 6,472,775 | B1 * | 10/2002 | Huang et al. .................. | 307/105 |
| 6,657,322 | B2 * | 12/2003 | Skibinski et al. ............. | 307/105 |
| 7,057,908 | B2 * | 6/2006 | Tarkiainen et al. ............. | 363/39 |

FOREIGN PATENT DOCUMENTS

| | | |
|---|---|---|
| JP | 2005-245117 A | 9/2005 |
| JP | 2006-185243 A | 7/2006 |

OTHER PUBLICATIONS

Kempei Seki, "Analysis of an AC LC Ladder Circuit with Spiral Vector Theory," IEEE, PCC-Osaka, 2002, pp. 749-754.
Kempei Seki, "Development of Integral Method for Measuring RMS Active and Reactive Power in Single- and Multiphase Networks," CEPSI 2002, Fukuoka, pp. 250-255.

* cited by examiner

*Primary Examiner*—Albert W Paladini
*Assistant Examiner*—Hal I Kaplan
(74) *Attorney, Agent, or Firm*—Buchanan Ingersoll & Rooney PC

(57) ABSTRACT

An active filter that can remove harmonic noises other than the fundamental wave in a system having many unspecified harmonics and can contribute to the stable operation of the system, and improvement in the quality of power is provided. Using the following power equation (1) for a single-phase circuit as a basic expression, an active power effective value P and a reactive power effective value Q are obtained by integration operation with an active power instantaneous value and a reactive power instantaneous value, an instantaneous voltage estimation value is calculated, the system side fundamental wave current is obtained based on these values, and then the system side fundamental wave current is subtracted from the load current to obtain compensation current as the output of the active filter.

8 Claims, 8 Drawing Sheets

ACTIVE FILTER

BACKGROUND OF THE INVENTION

1. Field of the Invention

The present invention relates to an active filter that restrains a harmonic component in a power system.

2. Description of the Related Art

For example, as disclosed by JP-A-2005-245117, a conventional active filter generally employs a method of obtaining compensation current used to restrain a harmonic component by carrying out dq axis transformation to detected system current.

The active filter can restrain a current harmonic only at one particular frequency present in a power system and cannot remove harmonic noises other than a fundamental wave in a system where multiple unspecified harmonics exist.

In general, a large number of harmonics with different frequency components exist in a power system, and therefore the use of the conventional active filter can neither provide a sufficient compensation effect nor restrain voltage harmonics.

This can be a significantly critical disadvantage in consideration of how the affects of harmonic noises increase as future development of power electronics industries, expansion of distributed power sources, and increase in various kinds of harmonic sources in power systems.

SUMMARY OF THE INVENTION

The invention has been made in view of the above described point, and it is an object of the invention to provide an active filter that can remove harmonic noises other than the fundamental wave in a power system having a large number of unspecified harmonics and can contribute to stable operation of the system and improvement in the quality of power based on a novel theory.

An active filter according to the invention is connected between a power system and a load to supply compensation current used to restrain a harmonic component in load current and includes voltage and current detecting means for detecting instantaneous voltage and instantaneous current at the power system, A/D converting means for converting the detected instantaneous voltage and the detected instantaneous current into digital data, active power instantaneous value and reactive power instantaneous value calculating means for calculating an active power instantaneous value and a reactive power instantaneous value using the instantaneous voltage and the instantaneous current converted to the digital data, active power effective value and reactive power effective value calculating means for calculating an active power effective value and a reactive power effective value using the calculated active power instantaneous value and the calculated reactive power instantaneous value by integration method, system side fundamental wave current calculating means for calculating fundamental wave current on the power system side using the calculated active power effective value and the calculated reactive power effective value and compensation current output means for outputting the difference between the load current and the system side fundamental wave current as the compensation current.

Using the active filter according to the invention, a large number of unspecified harmonic noises other than the fundamental wave can considerably be eliminated, so that the power system can be operated more stably and the quality of power can be improved.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
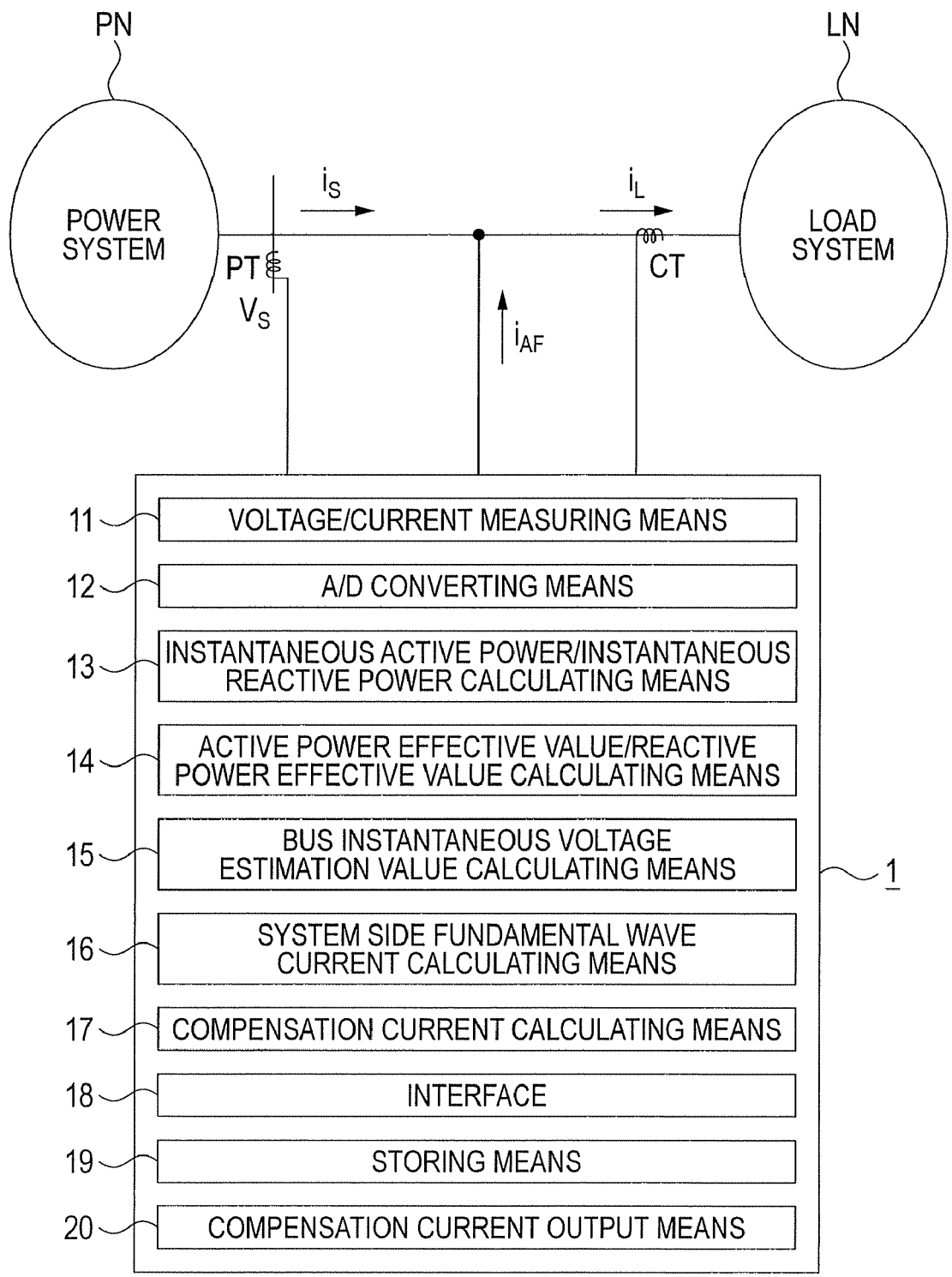
FIG. 1 is a functional block diagram of an active filter according to a first embodiment of the invention.

To start with, the basic idea of the invention will be described.

According to the basic idea of the invention, the conventional dq-axis transformation is not performed, and a novel active filter is implemented based on analysis/control of an AC circuit formed based on a new AC theory according to which state variables are represented by complex numbers. The basic formula therefor is the following power equation for a single-phase circuit:

$$P + jQ = \frac{1}{2}(vi^*) \quad (1)$$

where P is an active power effective value, Q is a reactive power effective value, v is an instantaneous complex number voltage (the real part of which is a measured instantaneous voltage value), i is an instantaneous complex number current (the real part of which is a measured instantaneous current value), and i* is the conjugation of the current i.

According to the expression, a voltage/current instantaneous value can be formed into an active power effective value/reactive power effective value and therefore the expression is very important.

Now, how Expression (1) is established will be accounted for.

A sinusoidal voltage v and a sinusoidal current i are represented as follows:

$$v = \sqrt{2}Ve^{j(\omega t + \phi)} \quad (2)$$

where V is a fundamental wave (50 Hz or 60 Hz) voltage effective value, ω is a fundamental wave angular velocity, and φ is a fundamental wave voltage initial phase angle.

$$i = \sqrt{2} I e^{j(\omega t + \theta)} \quad (3)$$

where I is a fundamental wave (50 Hz or 60 Hz) current effective value, ω is a fundamental wave angular velocity, and θ is a fundamental wave current initial phase angle.

From Expressions (1) to (3), the following expression is established.

$$\frac{1}{2}(vi^*) = VI\cos(\varphi - \theta) + jVI\sin(\varphi - \theta) \quad (4)$$

An active power effective value P and a reactive power effective value Q by the sinusoidal voltage v and the sinusoidal current i are as follows:

$$P = \frac{1}{T}\int_{-T}^{0} p \, dt = \frac{1}{T}\int_{-T}^{0}\left[\frac{1}{2}\text{Re}(vi^* + vi)\right]dt \quad (5)$$
$$= \frac{1}{T}\int_{-T}^{0}[VI\cos(\varphi - \theta) + VI\cos(2\omega t + \varphi + \theta)]dt$$
$$= VI\cos(\varphi - \theta)$$

where p is an active power instantaneous value.

As can be understood from the expression, the active power instantaneous value p equals a constant term power VI cos (φ−θ) plus a power VI cos(2ωt+φ+θ) oscillating at a doubled frequency. As can be seen, in the single-phase circuit, the active power instantaneous value p is not equal to the active power effective value P.

$$Q = \frac{1}{T}\int_{-T}^{0} q \, dt = \frac{1}{T}\int_{-T}^{0}\left[\frac{1}{2}\text{Im}(vi^* + vi)\right]dt \quad (6)$$
$$= \frac{1}{T}\int_{-T}^{0}[VI\sin(\varphi - \theta) + VI\sin(2\omega t + \varphi + \theta)]dt$$
$$= VI\sin(\varphi - \theta)$$

where q is a reactive power instantaneous value.

As can be understood from the expression, the reactive power instantaneous value q equals a constant term power VI sin (φ−θ) plus a power VI sin (2ωt+φ+θ) oscillating at a doubled frequency. As can be seen, in the single-phase circuit, the reactive power instantaneous value q is not equal to the reactive power effective value Q.

As can be understood from the above Expressions (2) to (6), Expression (1) is established.

Now, in order to apply Expression (1) to an active filter, Expression (1) is developed as follows:

$$vi^* = (v_{re} + jv_{im})(i_{re} - ji_{im}) = v_{re}i_{re} + v_{im}i_{im} + j(v_{im}i_{re} - v_{re}i_{im}) \quad (7)$$

where the subscript re represents a real part, im represents an imaginary part.

Substitution of the above expression in Expression (1) yields the following expression:

$$i_{re} = 2\frac{Pv_{re} + Qv_{im}}{v_{re}^2 + v_{im}^2} \quad (8)$$

As can be understood from the above expression, the sinusoidal current i can be obtained if the active power effective value P, the reactive power effective value Q, and the sinusoidal voltage v are available.

When the active power effective value P and the reactive power effective value Q are obtained by integration method, the active power effective value P and the reactive power effective value Q thus obtained are those only for the fundamental wave component power. Then, the sinusoidal voltage v is obtained by least squares method, the system side fundamental wave current is calculated using Expression (1), and finally the difference between the load current including the harmonic current component and the obtained sinusoidal current i is obtained, so that compensation current by the active filter only for the harmonic component is obtained.

Now, the specific construction and function of the active filter according to the first embodiment of the invention will be described with reference to FIGS. 1 and 2.

FIG. 1 is a functional block diagram of the active filter according to the first embodiment of the invention, the active filter 1 is connected between a power system PN and a load system LN, outputs a compensation current $i_{AF}$ that cancels the harmonic component of a load current $i_L$ based on a bus voltage vs detected by a voltage detection transformer PT and the load current $i_L$ detected by a current detection transformer CT, makes the system side current is into a fundamental sinusoidal wave, and restrains adverse effects of the power system upon other users.

The active filter 1 includes voltage and current measuring means 11 for inputting time-series data about the bus voltage and the load current detected by the voltage detection transformer PT and the current detection transformer CT, A/D converting means 12 for converting time-series analog data into time-series digital data, active power instantaneous value/reactive power instantaneous value calculating means 13 for calculating an active power instantaneous value using instantaneous voltage and instantaneous current, active power effective value/reactive power effective value calculating means 14 for calculating an active power effective value and a reactive power effective value using the active power instantaneous value and the reactive power instantaneous value by integration method, bus instantaneous voltage estimation value calculating means 15 for measuring a power system frequency using instantaneous bus voltage value data and calculating instantaneous voltage estimate values at present and at a previous point by 90° using the measured frequency by least squares method, system side fundamental wave current calculating means 16 for calculating system side fundamental wave current $i_s$ using the active power effective value, the reactive power effective value, and the bus instantaneous voltage estimation value, compensation current calculating means 17 for calculating compensation current $i_{AF} = i_L - i_s$ as the difference between a measured load side current value $i_L$ and the system side fundamental wave current $i_s$, an interface 18 for indicating each of input amounts and output amounts and intermediate calculation amounts in the active filter 1, storing means 19 for storing data, and compensation current output means 20 for outputting the compensation current to the system using an amplifier based on output amounts calculated.

Figure 2:
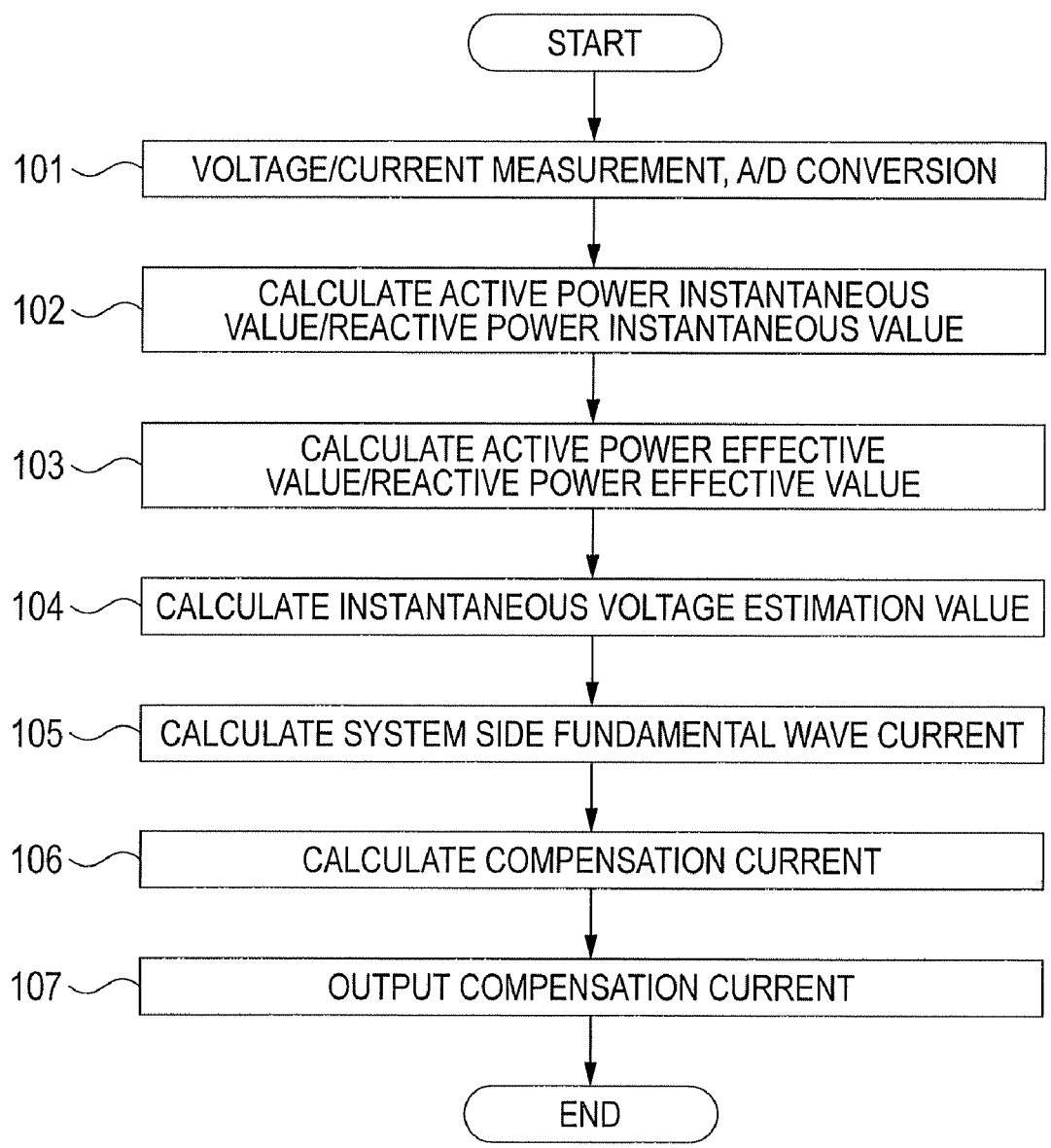
FIG. 2 is a flowchart for use in illustrating the process of operation of the active filter according to the first embodiment.

FIG. 2 is a flowchart for use in illustrating the process of operation by the active filter 1.

In step 101, voltage and current measurement and A/D conversion are carried out.

By Fourier transform, the voltage instantaneous value v of the circuit may be represented as follows:

$$v = \sqrt{2}\, V e^{j(\omega t + \varphi)} + \sqrt{2} \sum_{k=1}^{M} V_k e^{j(\omega_k t + \varphi_k)} \tag{9}$$

where v is a fundamental wave (50 Hz or 60 Hz) voltage effective value, $\omega$ is a fundamental wave angular velocity, $\phi$ is a fundamental wave voltage initial phase, Vk is a k-order harmonic voltage effective value, $\omega$k is a k-order harmonic voltage angular velocity, $\phi$k is a k-order harmonic voltage initial phase, and M is an arbitrary positive integer. More specifically, the voltage instantaneous value consists of the voltage fundamental wave component and many voltage harmonic components.

Note that the complex number voltage v in Expression (9) can be divided into a real part and an imaginary part.

$$v = v_{re} + j v_{im} \tag{10}$$

The real part $v_{re}$ and the imaginary part $v_{im}$ of the voltage instantaneous value v are represented by the following expressions. The measured value is defined as the real part.

In this way, a cosine function is used for the waveform of the voltage measured instantaneous value.

$$v_{re} = \sqrt{2}\, V\cos(\omega t + \varphi) + \sqrt{2} \sum_{k=1}^{M} V_k \cos(\omega_k t + \varphi_k) \\ v_{im} = \sqrt{2}\, V\sin(\omega t + \varphi) + \sqrt{2} \sum_{k=1}^{M} V_k \sin(\omega_k t + \varphi_k) \tag{11}$$

By Fourier transform, the current instantaneous value i of the circuit can be represented as follows:

$$i = \sqrt{2}\, I e^{j(\omega t + \theta)} + \sqrt{2} \sum_{k=1}^{N} I_k e^{j(\omega_k t + \theta_k)} \tag{12}$$

where I is the fundamental wave current effective value, $\omega$ is the fundamental wave angular velocity, $\theta$ is the fundamental wave current initial phase, $I_K$ is a k-order harmonic current effective value, $\omega$k is the k-order harmonic current angular velocity, $\phi$k is the k-order harmonic voltage initial phase, and N is an arbitrary positive integer. More specifically, the current instantaneous value i consists of the current fundamental component and many current harmonic components.

Note that the complex number current i in Expression (12) can be divided into a real part and an imaginary part.

$$i = i_{re} + j i_{im} \tag{13}$$

The real part $i_{re}$ and the imaginary part $i_{im}$ of the current instantaneous value i are represented by the following expressions. The measured value is defined as the real part. In this way, a cosine function is used for the waveform of the current measured instantaneous value.

$$i_{re} = \sqrt{2}\, I\cos(\omega t + \theta) + \sqrt{2} \sum_{k=1}^{N} I_k \cos(\omega_k t + \theta_k) \\ i_{im} = \sqrt{2}\, I\sin(\omega t + \theta) + \sqrt{2} \sum_{k=1}^{N} I_k \sin(\omega_k t + \theta_k) \tag{14}$$

In step 102, the active power instantaneous value p and the reactive power instantaneous value q are calculated.

The single-phase active power instantaneous value p is defined as follows:

$$p = \frac{1}{2}\mathrm{Re}(vi + vi^*) = v_{re} \cdot i_{re} \tag{15}$$

where Re is a real part, v is complex number voltage, and i is complex number current. i* is the conjugation of the current i.

Substituting the current expression and the voltage expression in the above expression yields the following expression:

$$p = VI\cos(\phi-\theta) + VI\cos(2\omega t + \phi + \theta) + p_{harmonic} \tag{16}$$

In this way, the active power instantaneous value p consists of the fundamental frequency component and the frequency component other than the fundamental wave.

The active power instantaneous value $p_{harmonic}$ for the frequencies other than fundamental wave is calculated as follows:

$$p_{harmonic} = 2V\cos(\omega t + \varphi) \cdot \sum_{k=1}^{N} I_k \cos(\omega_k t + \theta_k) + \\ 2I\cos(\omega t + \theta) \cdot \sum_{k=1}^{M} V_k \cos(\omega_k t + \varphi_k) + \\ 2\sum_{k=1}^{M} V_k \cos(\omega_k t + \varphi_k) \cdot \sum_{k=1}^{N} I_k \cos(\omega_k t + \theta_k) \tag{17}$$

The single-phase reactive power instantaneous value q is defined as follows:

$$q = \frac{1}{2}\mathrm{Im}(vi + vi^*) = v_{im} \cdot i_{re} \tag{18}$$

Substituting the current expression and the voltage expression in the above expression yields the following expression:

$$q = VI\sin(\phi-\theta) + VI\sin(2\omega t + \phi + \theta) + q_{harmonic} \tag{19}$$

In this way, the reactive power instantaneous value q consists of the fundamental frequency component and the frequency component other than the fundamental wave.

The reactive power instantaneous value $q_{harmonic}$ for the frequencies other than fundamental wave is calculated as follows:

$$q_{harmonic} = 2V\sin(\omega t + \varphi) \cdot \sum_{k=1}^{N} I_k \cos(\omega_k t + \theta_k) + \qquad (20)$$

$$2I\sin(\omega t + \theta) \cdot \sum_{k=1}^{M} V_k \cos(\omega_k t + \varphi_k) +$$

$$2\sum_{k=1}^{M} V_k \sin(\omega_k t + \varphi_k) \cdot \sum_{k=1}^{N} I_k \cos(\omega_k t + \theta_k)$$

In step 103, the active power effective value P and the reactive power effective value Q are calculated.

The single-phase active power effective value P is defined as follows:

$$P = \frac{1}{T}\int_{-T}^{0} p\, dt \qquad (21)$$

where T is time for one cycle, which is 0.016666667 seconds in a 60 Hz system and 0.02 seconds in a 50 Hz system.

Substituting the active power instantaneous value p in the above expression yields the following expression:

$$P = VI\cos(\varphi - \theta) + \frac{1}{T}\int_{-T}^{0} p_{harmonic}\, dt \qquad (22)$$

The single-phase reactive power effective value Q is as follows:

$$Q = \frac{1}{T}\int_{-T}^{0} q\, dt \qquad (23)$$

Substituting the reactive power instantaneous value q in the above expression yields the following expression:

$$Q = VI\sin(\varphi - \theta) + \frac{1}{T}\int_{-T}^{0} q_{harmonic}\, dt \qquad (24)$$

As a result of calculation using system data having many harmonics, the following two expressions are established in general, provided that the frequencies of the harmonics are not less than twice the fundamental frequency.

$$\frac{1}{T}\int_{-T}^{0} p_{harmonic}\, dt \approx 0 \qquad (25)$$

and $$\frac{1}{T}\int_{-T}^{0} q_{harmonic}\, dt \approx 0 \qquad (26)$$

If the frequencies f the harmonics are less than twice the fundamental frequency, a moving average value in a prescribed period is obtained, so that the active power effective value P and the reactive power effective value Q of frequency component power other than the fundamental wave component can be null.

$$\frac{1}{4M}\sum_{k=-4M}^{1}\left(\frac{1}{T}\int_{-T}^{0} p_{harmonic}\, dt\right)k \approx 0 \qquad (27)$$

and $$\frac{1}{4M}\sum_{k=-4M}^{1}\left(\frac{1}{T}\int_{-T}^{0} q_{harmonic}\, dt\right)k \approx 0 \qquad (28)$$

where 4M is the number of sampling data pieces, and the sampling period is desirably at least three cycles of the fundamental wave.

In step 104, the instantaneous voltage estimation value $v_{re\_est}$ is calculated.

The fundamental wave voltage value $v_{re}$ is developed by the following expression.

$$v_{re} = \sqrt{2}V\cos(\omega t + \phi) = \sqrt{2}V\cos\phi\cos\omega t + \sqrt{2}V\sin\phi\sin\omega t = P_1\cos\omega t + P_2\sin\omega t \qquad (29)$$

The measured instantaneous voltage value $v_{rex}$ is represented in a matrix form.

$$\begin{bmatrix} v_{re1} \\ v_{re2} \\ \vdots \\ v_{ren} \end{bmatrix} = \begin{bmatrix} \cos\omega t_1 & \sin\omega t_1 \\ \cos\omega t_2 & \sin\omega t_2 \\ \vdots & \vdots \\ \cos\omega t_n & \sin\omega t_n \end{bmatrix} \begin{bmatrix} P_1 \\ P_2 \end{bmatrix} \qquad (30)$$

where the state variable matrix is as follows:

$$[A] = \begin{bmatrix} \cos\omega t_1 & \sin\omega t_1 \\ \cos\omega t_2 & \sin\omega t_2 \\ \vdots & \vdots \\ \cos\omega t_n & \sin\omega t_n \end{bmatrix} \qquad (31)$$

The voltage instantaneous value state variable matrix is as follows:

$$[v] = \begin{bmatrix} v_{re1} \\ v_{re2} \\ \vdots \\ v_{ren} \end{bmatrix} \qquad (32)$$

The coefficient matrix is as follows:

$$[P] = \begin{bmatrix} P_1 \\ P_2 \end{bmatrix} \qquad (33)$$

Consequently, the following expression is established.

$$[v] = [A][P] \qquad (34)$$

The coefficients can be obtained by the following expression by least squares method.

$$[P] = ([A]^T[A])^{-1}[A]^T[v] \qquad (35)$$

where $[A]^T$ is a transposed matrix and can be represented by the following expression.

$$[A]^T = \begin{bmatrix} \cos\omega_1 t & \cos\omega_2 t & \cdots & \cos\omega_n t \\ \sin\omega_1 t & \sin\omega_2 t & \cdots & \sin\omega_n t \end{bmatrix} \begin{bmatrix} P_1 \\ P_2 \end{bmatrix} \quad (36)$$

The instantaneous voltage estimation value $V_{re\_est}$ is obtained by substituting the coefficients $P_1$ and $P_2$ in the following expression:

$$v_{re\_est} = P_1 \cos\omega t + P_2 \sin\omega t \quad (37)$$

Note that if the waveform of the system voltage is that of a sinusoidal wave, this step is omitted in order to save the calculation time.

In step 105, the system side fundamental wave current value $i_{re}$ is calculated according to the following expression:

$$i_{re} = 2\frac{Pv_{re} + Qv_{im}}{v_{re}^2 + v_{im}^2} \quad (38)$$

where $v_{re}$ is a measured voltage instantaneous value at present, $v_{im}$ is a voltage instantaneous value at a previous point by an electrical angle of 90° (data 5 ms earlier in a system with the measured frequency of 50 Hz), and P and Q are the active power effective value and the reactive power effective value obtained by integration method. In this way, the system side fundamental wave current $i_{re}$ can be obtained.

The system side fundamental wave current $i_{re}$ in step 105 may be calculated by the following second method.

The voltage effective value V obtained by integration method is used for the denominator in Expression (38) instead of the measured voltage instantaneous value.

$$i_{re} = \frac{Pv_{re} + Qv_{im}}{V^2} \quad (39)$$

where the voltage effective value V is represented as follows:

$$V = \sqrt{\frac{v_{re}^2 + v_{im}^2}{2}} \quad (40)$$

The voltage effective value V is calculated by the following expression:

$$V = \sqrt{\frac{1}{T}\int_{-T}^{0} v_{re}^2 dt} = \sqrt{\frac{1}{4N}\sum_{k=1}^{4N} v_{re}^2(k-4N)} \quad (41)$$

It is assumed that the fundamental wave is divided by 4N (N: integer). If it is for example divided by an electrical angle of 30°, N=3 and 4N=12. Based on the definition of the active power effective value, the calculation is on the basis of one cycle time of the fundamental wave (electrical angle of 360°), but another integration time (for example an electrical angle of 90° or 180°) may be selected for system construction.

Furthermore, the calculation of the system side fundamental wave current $i_{re}$ in step 105 may be carried out by the following third method.

If a moving average value $v_{ave}$ of voltage effective values is obtained, an even more stable value can be obtained.

$$V_{ave} = \frac{1}{4N}\sum_{k=1}^{4N} V(k-4N) \quad (42)$$

The voltage instantaneous value obtained by least squares estimation calculation is used.

$$i_{re} = \frac{Pv_{re\_est} + Qv_{im\_est}}{V_{ave}^2} \quad (43)$$

where $v_{re\_est}$ is a voltage estimation value at present, $v_{im\_est}$ is a voltage estimation value at a previous point by an electrical angle of 90° (T/4 in time).

Furthermore, the calculation of the system side fundamental wave current value $i_{re}$ in step 105 can be carried out by the following fourth method.

If moving averages of active power effective values P and reactive power effective values Q are obtained, an even more stable value can be obtained.

$$P_{ave} = \frac{1}{4N}\sum_{k=1}^{4N} P(k-4N) \quad (44)$$

$$Q_{ave} = \frac{1}{4N}\sum_{k=1}^{4N} Q(k-4N) \quad (45)$$

The system side fundamental wave current value $i_{re}$ can be obtained as follows:

$$i_{re} = \frac{P_{ave}v_{re\_est} + Q_{ave}v_{im\_est}}{V_{ave}^2} \quad (46)$$

In step 106, the compensation current $i_{AF}$ as the output of the active filter is calculated by subtracting the system side fundamental wave current $i_{re}$ from the load current $i_L$ as expressed by the following Expression (47).

$$i_{AF} = i_L - i_{re} \quad (47)$$

In step 107, the compensation current $i_{AF}$ is output.

Figure 3:
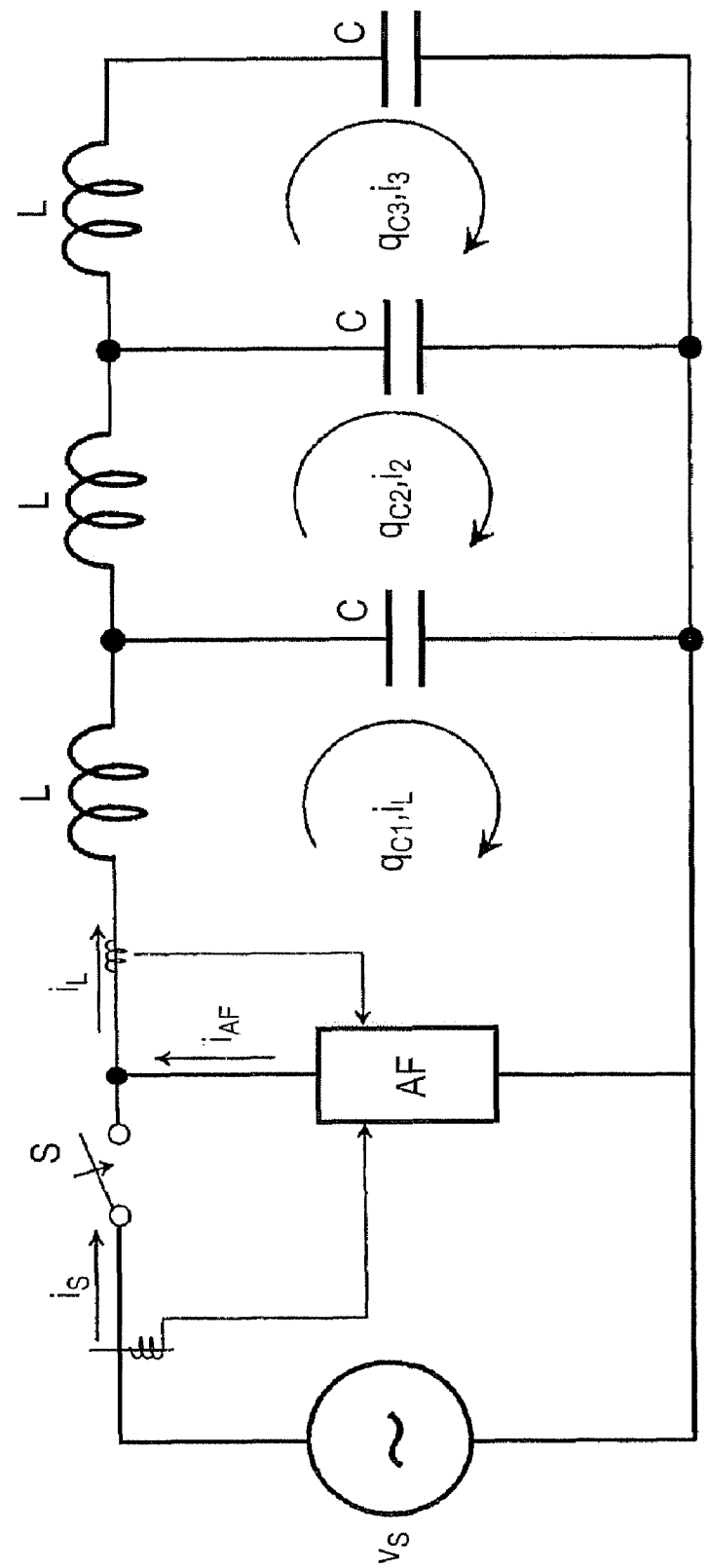
FIG. 3 is a model system diagram for carrying out simulations of the active filter according to the first embodiment.

Now, with reference to a model system diagram of an LC circuit as shown in FIG. 3, a result of simulation is shown. Note that the model system is disclosed in "Analysis of an AC LC Ladder Circuit with Spiral Vector Theory," of IEEE paper, PCC 2002, and for more details of the model, please refer to the paper.

In FIG. 3, L represents an inductor, C represents a capacitor, Vs represents a power supply, AF represents the active filter according to the invention, and S represents a switch. The reference numeral $i_s$ is the system side current, $i_L$ is the load side current, and $i_{AF}$ is the compensation current as the output of the active filter AF.

When the switch S is turned on, transient current is generated through the LC circuit.

A constant current solution for the circuit is as follows:

$$\begin{bmatrix} i_1 \\ i_2 \\ i_3 \end{bmatrix} = \begin{bmatrix} 1-\omega^2 LC & -1 & 0 \\ -1 & 2-\omega^2 LC & -1 \\ 0 & -1 & \omega^2 LC \end{bmatrix}^{-1} \begin{bmatrix} j\omega C \dot{V}_S \\ 0 \\ 0 \end{bmatrix} \quad (48)$$

The characteristic equation of the circuit is as follows:

$$L^3 C^3 p^6 q_{C3} + 5L^2 C^2 p^4 q_{C3} + 6LC p^2 q_{C3} + q_{C3} = C v_S \quad (49)$$

Solutions of the above expressions are three imaginary numbers. This means eternal oscillation with the fundamental wave plus three harmonics. The transient current is not attenuated in the absence of a resistance component R.

$$\left.\begin{array}{l} \delta_1 = j\omega_1 \\ \delta_2 = j\omega_2 \\ \delta_3 = j\omega_3 \end{array}\right\} \quad (50)$$

Solutions to the charge are as follows:

$$q_{C3} = \frac{\sqrt{2}\,\hat{i}_3}{j\omega} + A_1 e^{j(\omega_1 t + \varphi_{A1})} + A_2 e^{j(\omega_2 t + \varphi_{A2})} + A_3 e^{j(\omega_3 t + \varphi_{A3})} \quad (51)$$

$$q_{C2} = LCp^2 q_{C3} + 2q_{C3} \quad (52)$$

$$q_{C1} = LCp^2 q_{C2} + 2q_{C2} - q_{C3} \quad (53)$$

Solutions to the current are as follows:

$$i_L = \sqrt{2}\hat{i}_3 + \omega t_1 A_1 e^{j(\omega_1 t + \phi_{A1})} + j\omega_2 A_2 e^{j(\omega_2 t + \phi_{A2})} + j\omega_3 A_3 e^{j(\omega_3 t + \phi_{A3})} \quad (54)$$

$$i_2 = LCp^3 q_{C3} + 2pq_{C3} \quad (55)$$

$$i_3 = LCp^3 q_{C2} + 2pq_{C2} - pq_{C3} \quad (56)$$

where $A_1$, $A_2$, and $A_3$ are constants determined based on the system initial conditions.

Specific numbers are assigned for simulation as follows:

L=1(mH), C=100(μF)

The fundamental frequency is 50 Hz. The fundamental wave angular velocity is given as:

ω=2πf=2π×50=314.15926(rad/s)

From the characteristic equation, the three oscillation terms are given as:

$$\left.\begin{array}{l} \omega_1 = 1407 \text{ (rad/s)} \\ \omega_2 = 3943 \text{ (rad/s)} \\ \omega_3 = 5698 \text{ (rad/s)} \end{array}\right\} \quad (57)$$

Assume that the effective value of the power supply voltage Vs=1(V).

When t=0, assuming that the initial phase p of the power supply voltage Vs equals 90, the switch S is closed.

FIGS. 4 to 8 are waveform charts showing simulation results.

Figure 4:
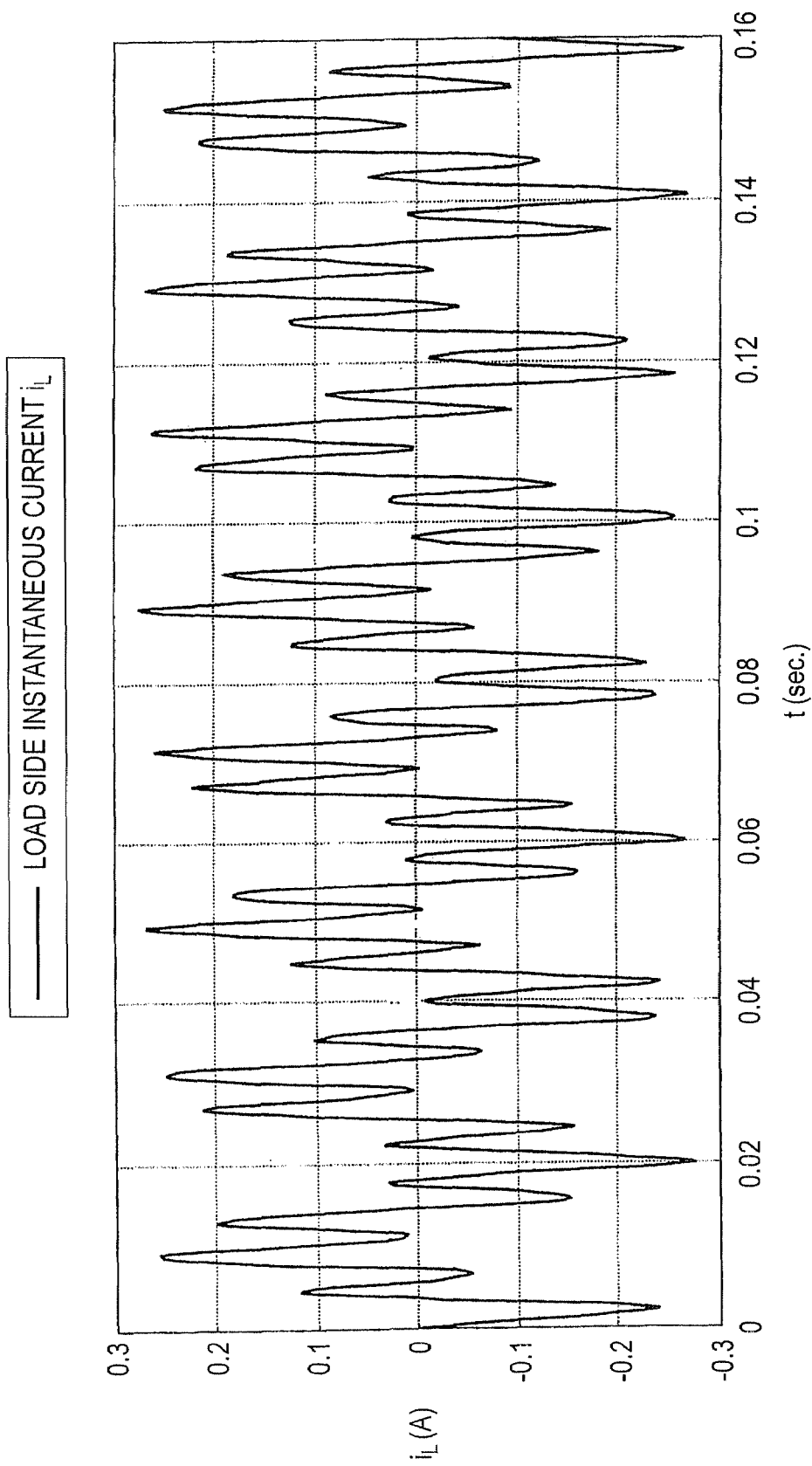
FIG. 4 is a waveform chart of a load current representing a result of simulation.

FIG. 4 shows the waveform of the load current $i_L$ in which the fundamental wave current and the current of the three harmonic components are overlapped in oscillation.

Figure 5:
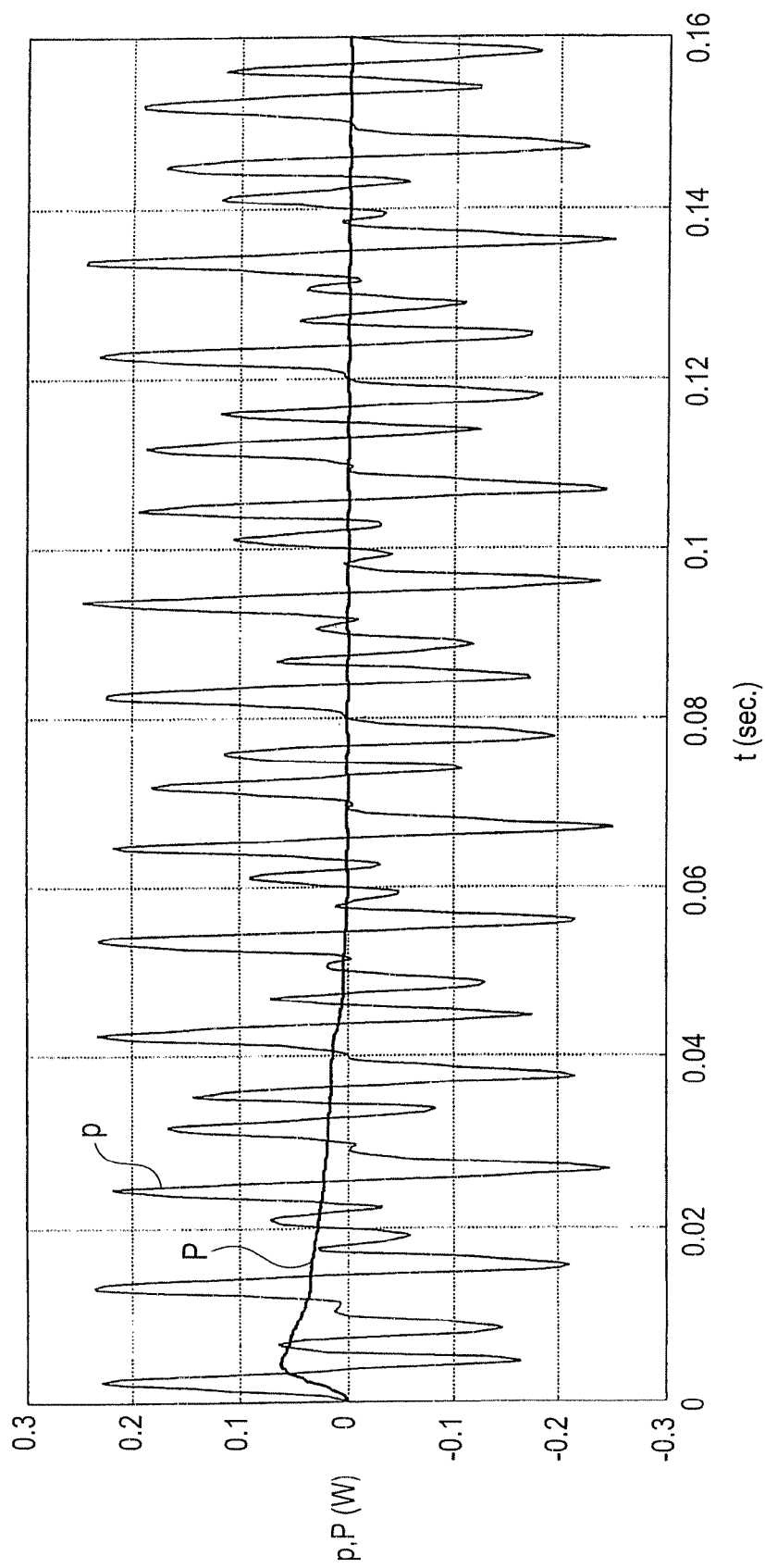
FIG. 5 is a waveform chart of an active power instantaneous value and an active power effective value representing a result of simulation.

FIG. 5 shows the waveforms of the active power instantaneous value p and the active power effective value P. The active power instantaneous value p oscillates, while the active power effective value P converges to a fixed value. This shows that the result of the integration calculation of the active power instantaneous value including the harmonics agrees with the result of operation of the active power instantaneous value of the fundamental wave component alone.

Note that in the model circuit, the active power effective value is zero in the absence of the resistance component R.

Figure 6:
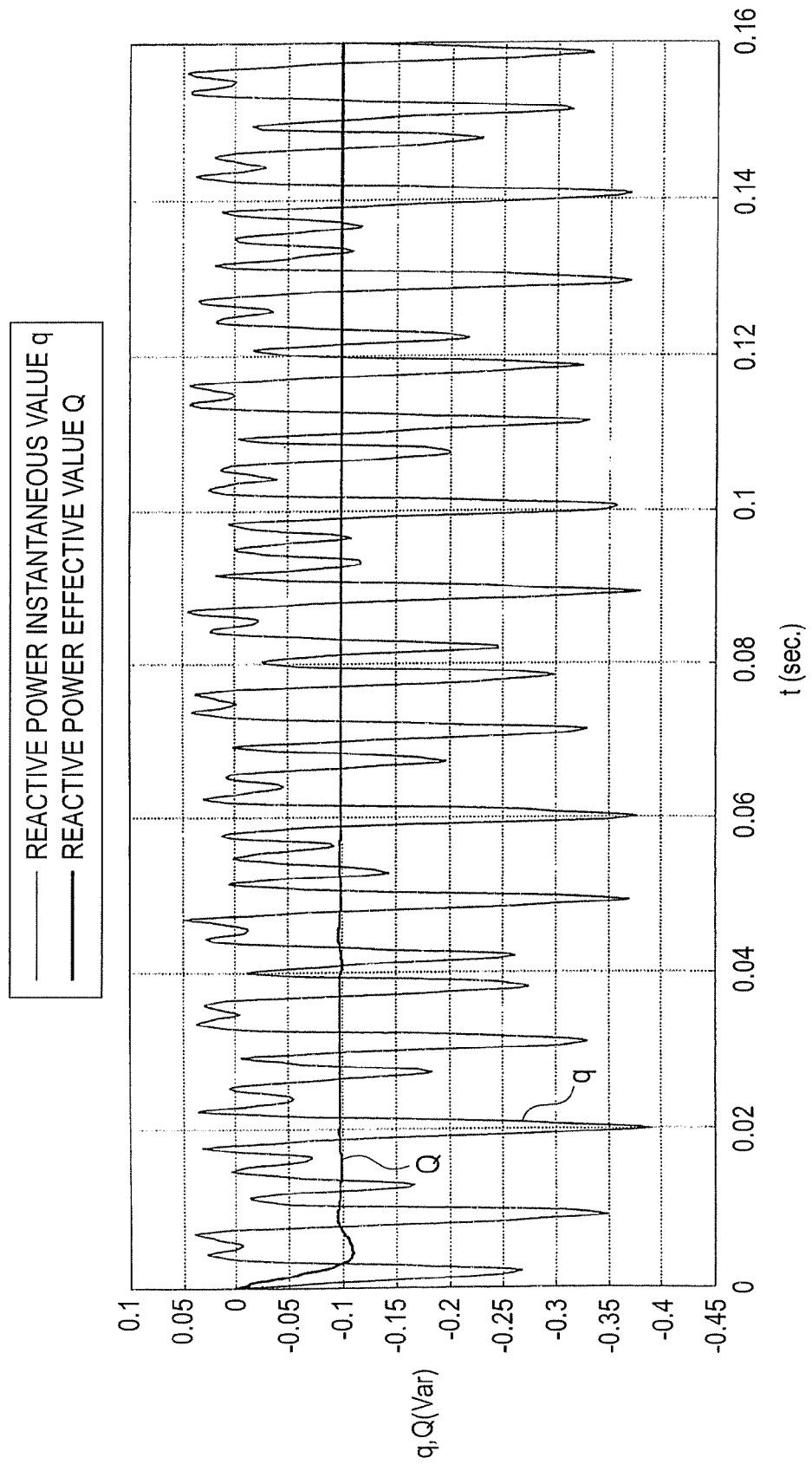
FIG. 6 is a waveform chart of a reactive power instantaneous value and a reactive power effective value representing a result of simulation.

FIG. 6 shows the waveforms of the reactive power instantaneous value q and the reactive power effective value Q. The reactive power instantaneous value q oscillates, while the reactive power effective value Q converges to a fixed value. This shows that the result of the integration calculation of the reactive power instantaneous value including the harmonics agrees with the operation result of the reactive power instantaneous value of the fundamental wave component alone (which is a key point of the invention).

Figure 7:
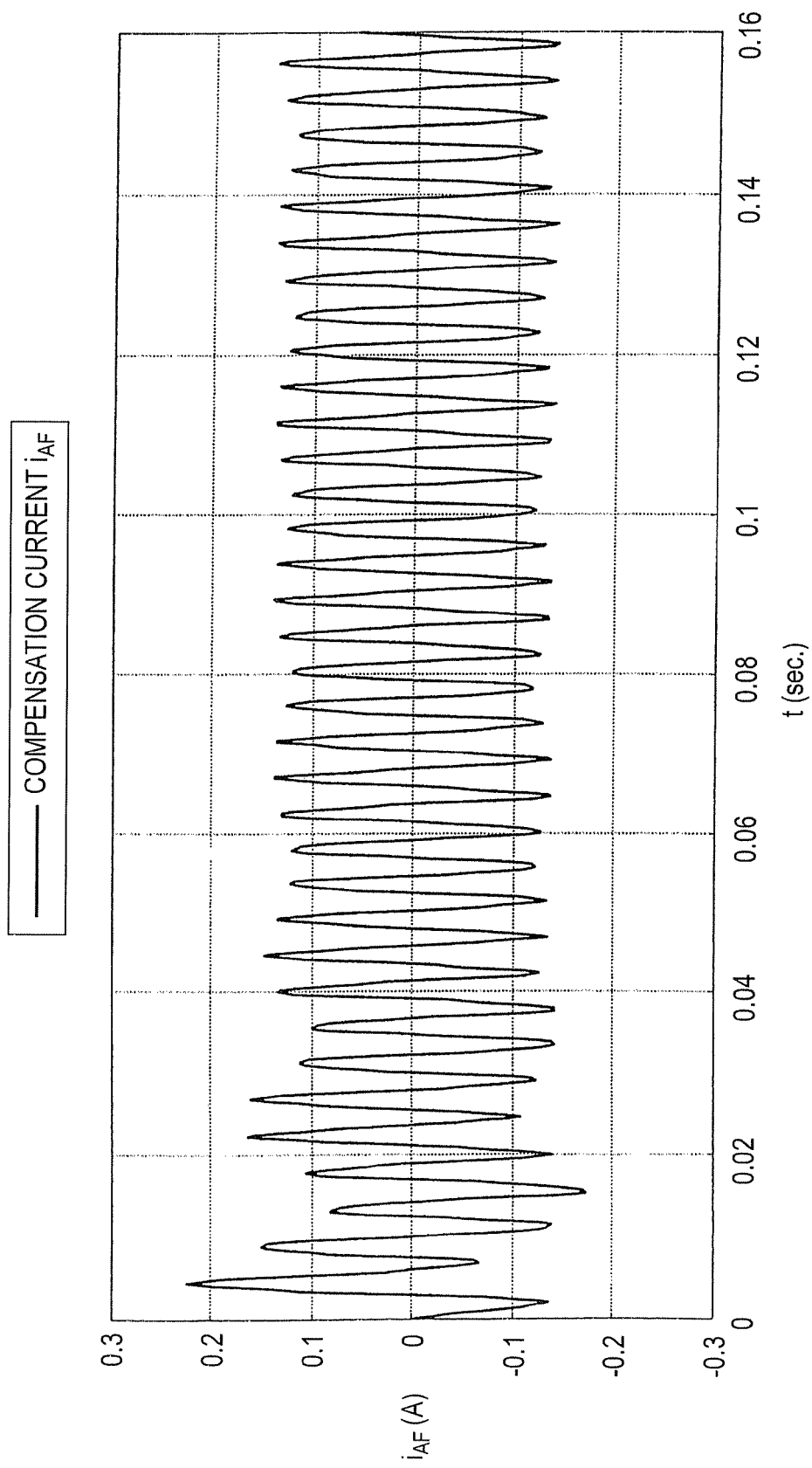
FIG. 7 is a waveform chart of compensation current as the output of the active filter representing a result of simulation.

FIG. 7 shows the waveform of the compensation current $i_{AF}$ as the output of the active filter AF, and the waveform of the compensation current $i_{AF}$ is that of the total value of the harmonic current other than the fundamental wave.

Figure 8:
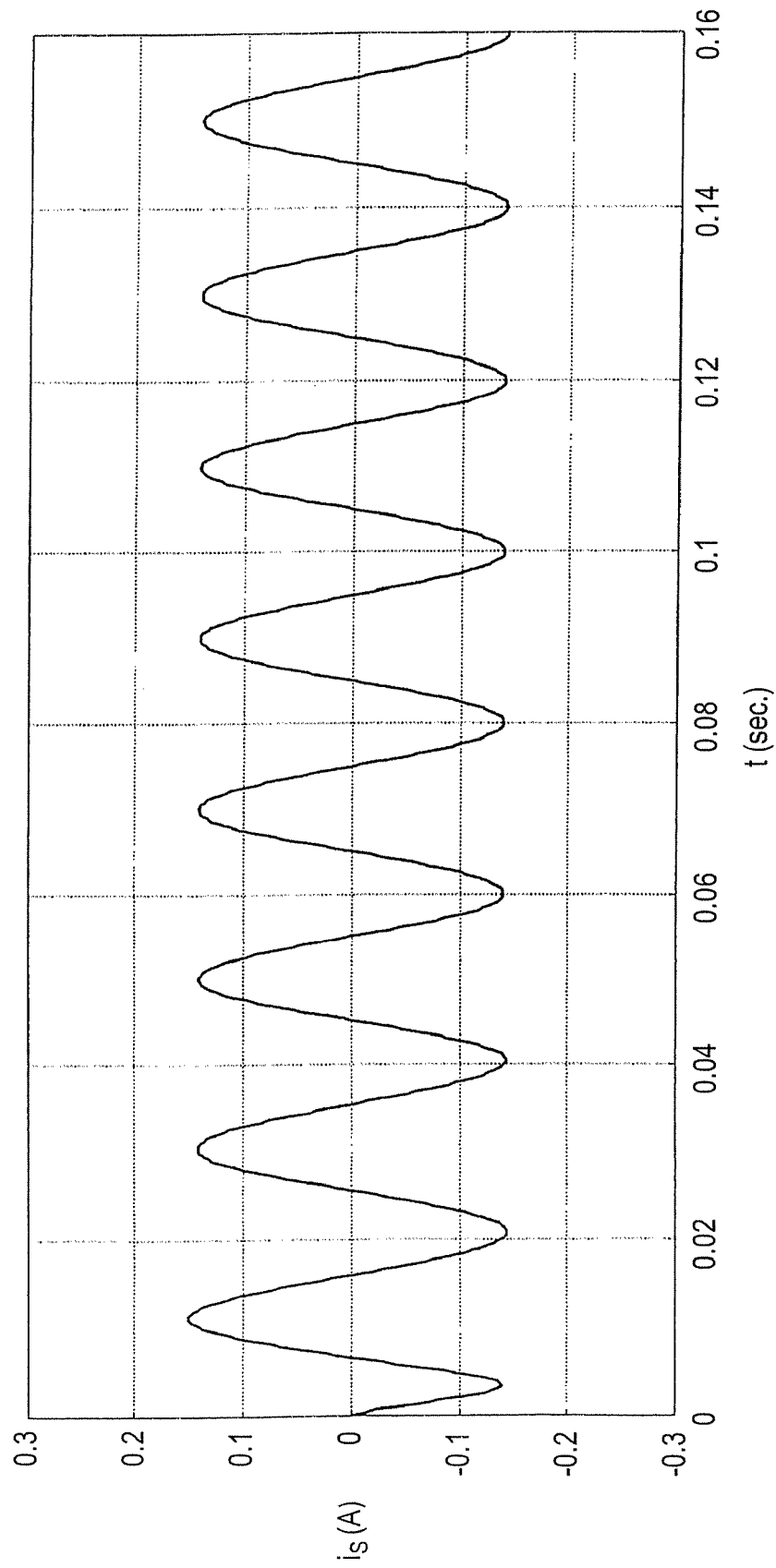
FIG. 8 is a waveform chart of system side current representing a result of simulation.

FIG. 8 shows the waveform of the system side current $i_s$ in parallel connection with the active filter AF. The system side current waveform is that of the fundamental wave alone.

Note that the invention is applicable not only to the single-phase circuit system but also to a multi-phase circuit system such as a three-phase balanced circuit system and a three-phase unbalanced circuit system.

Various modifications and alterations of this invention will be apparent to those skilled in the art without departing from the scope and spirit of this invention, and it should be understood that this is not limited to the illustrative embodiments set forth herein.

What is claimed is:

1. An active filter connected between a power system and a load to supply compensation current used to restrain a harmonic component in load current, comprising:
    voltage and current detecting means for detecting instantaneous voltage and instantaneous current at the power system;
    A/D converting means for converting the detected instantaneous voltage and the detected instantaneous current into digital data;
    active power instantaneous value and reactive power instantaneous value calculating means for calculating an active power instantaneous value and a reactive power instantaneous value using the instantaneous voltage and the instantaneous current converted to the digital data;
    active power effective value and reactive power effective value calculating means for calculating an active power effective value and a reactive power effective value using the calculated active power instantaneous value and the calculated reactive power instantaneous value by integration method;
    system side fundamental wave current calculating means for calculating fundamental wave current on the power system side using the calculated active power effective value and the calculated reactive power effective value; and
    compensation current output means for outputting the difference between the load current and the system side fundamental wave current as the compensation current.

2. The active filter according to claim 1, further comprising bus instantaneous voltage estimation value calculating means for measuring the frequency of the power system using the A/D converted instantaneous voltage value data and calculating instantaneous voltage estimation values at present and a point 90° previous by least squares method using the measured frequency, the system side fundamental wave current calculating means calculating the system side fundamental wave current using the calculated active power effective value, the calculated reactive power effective value, and the calculated bus instantaneous voltage estimation value.

3. The active filter according to claim 1, wherein the system side fundamental wave current calculating means calculates the system side fundamental wave current according to the following expression (38):

$$i_{re} = 2\frac{Pv_{re} + Qv_{im}}{v_{re}^2 + v_{im}^2} \tag{38}$$

where $i_{re}$ is the system side fundamental wave current, P is the active power effective value, Q is the reactive power effective value, $v_{re}$ is the real part of sinusoidal voltage, and $v_{im}$ is the imaginary part of the sinusoidal voltage.

4. The active filter according to claim 1, wherein the system side fundamental wave current calculating means calculates the system side fundamental wave current according to the following expression (39):

$$i_{re} = \frac{Pv_{re} + Qv_{im}}{V^2} \tag{39}$$

where $i_{re}$ is the system side fundamental wave current, P is the active power effective value, Q is the reactive power effective value, and V is a voltage effective value.

5. The active filter according to claim 1, wherein the system side fundamental wave current calculating means calculates the system side fundamental wave current according to the following expression (43):

$$i_{re} = \frac{Pv_{re\_est} + Qv_{im\_est}}{V_{ave}^2} \tag{43}$$

where $i_{re}$ is the system side fundamental wave current, P is the active power effective value, Q is the reactive power effective value, $V_{re\_est}$ is a voltage estimation value at present, and $V_{im\_est}$ is a voltage estimation value at a previous point by an electrical angle of 90°, and $V_{ave}$ is a moving average of voltage effective values.

6. The active filter according to claim 1, wherein the system side fundamental wave current calculating means calculates the system side fundamental wave current according to the following expression (46):

$$i_{re} = \frac{P_{ave}v_{re\_est} + Q_{ave}v_{im\_est}}{V_{ave}^2} \tag{46}$$

where $i_{re}$ is the system side fundamental wave current, $P_{ave}$ is a moving average of active power effective values, $Q_{ave}$ is a moving average of reactive power effective values, $V_{re\_est}$ is a voltage estimation value at present, and $V_{im\_est}$ is a voltage estimation value at a previous point by an electrical angle of 90°, and $V_{ave}$ is a moving average of voltage effective values.

7. The active filter according to claim 1, wherein the power system is a multi-phase circuit system.

8. An active filter connected between a power system and a load to supply compensation current used to restrain a harmonic component in load current, comprising:

voltage and current detecting devices for detecting instantaneous voltage and instantaneous current at the power system;

an A/D converter device for converting the detected instantaneous voltage and the detected instantaneous current into digital data;

an active power instantaneous value and reactive power instantaneous value calculating device for calculating an active power instantaneous value and a reactive power instantaneous value using the instantaneous voltage and the instantaneous current converted to the digital data;

an active power effective value and reactive power effective value calculating device for calculating an active power effective value and a reactive power effective value using the calculated active power instantaneous value and the calculated reactive power instantaneous value by integration method;

a system side fundamental wave current calculating device for calculating fundamental wave current on the power system side using the calculated active power effective value and the calculated reactive power effective value; and a compensation current output unit for outputting the difference between the load current and the system side fundamental wave current as the compensation current.

\* \* \* \* \*